(12) United States Patent
Gupta et al.

(10) Patent No.: US 10,878,192 B2
(45) Date of Patent: Dec. 29, 2020

(54) CONTEXTUAL DOCUMENT RECALL

(71) Applicant: Microsoft Technology Licensing, LLC, Redmond, WA (US)

(72) Inventors: Rahul Gupta, Hyderabad (IN); Vinay Shanthigrama Krishnegowda, Redmond, WA (US); Amar Kumar Dubedy, Redmond, WA (US); Rithesh Baradi, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 938 days.

(21) Appl. No.: 15/399,962

(22) Filed: Jan. 6, 2017

(65) Prior Publication Data

US 2018/0196812 A1    Jul. 12, 2018

(51) Int. Cl.
*G06F 40/284* (2020.01)
*G06F 16/335* (2019.01)

(52) U.S. Cl.
CPC .......... *G06F 40/284* (2020.01); *G06F 16/335* (2019.01)

(58) Field of Classification Search
CPC ............................. G06F 40/284; G06F 16/335
See application file for complete search history.

(56) References Cited

U.S. PATENT DOCUMENTS

| | | | | |
|---|---|---|---|---|
| 6,021,403 A * | 2/2000 | Horvitz | ................ | G06N 5/00 706/45 |
| 9,047,298 B2 * | 6/2015 | Agrawal | ................ | G06F 16/14 |
| 2005/0144162 A1 | 6/2005 | Liang | | |
| 2007/0038610 A1 * | 2/2007 | Omoigui | ................ | H04L 29/06 |
| 2010/0070448 A1 * | 3/2010 | Omoigui | ............ | H01L 27/1463 706/47 |
| 2010/0161578 A1 * | 6/2010 | Telang | ................ | G06F 16/907 707/706 |
| 2011/0179060 A1 * | 7/2011 | Chilakamarri | ......... | G06Q 10/00 707/769 |
| 2012/0023109 A1 * | 1/2012 | Sternemann | .......... | G06F 16/283 707/748 |

(Continued)

OTHER PUBLICATIONS

Sung-Bae, Cho, "Intelligent System Design for Episodic Memory on Mobile Daily Life", In Proceedings of Sixth International Conference of Intelligent Systems Design and Applications, Oct. 16, 2006, 1 page.

(Continued)

*Primary Examiner* — Albert M Phillips, III

(57) ABSTRACT

A framework for enhanced search is provided to enable the user to contextually search documents, based on specified events. A management framework provides systems for obtaining a user's contextual data and the user's interaction data for which a Context Graph and an Interaction Graph are created, respectively. The user's context data include the various events associated with the user. The user's interaction data include times and locations the user interacted with a particular document, which device was used, the type of interaction, etc. The data from the two graphs are correlated and joined into an event graph. Upon receiving a natural language query from a user, one or more contextual query elements are identified, and the event graph is spanned to identify matching results which are then provided to the requesting user device.

20 Claims, 9 Drawing Sheets

(56) References Cited

U.S. PATENT DOCUMENTS

| | | | |
|---|---|---|---|
| 2012/0209871 A1* | 8/2012 | Lai | G06F 16/907 707/769 |
| 2012/0239643 A1 | 9/2012 | Ekstrand et al. | |
| 2013/0041896 A1* | 2/2013 | Ghani | G06F 16/334 707/732 |
| 2014/0214937 A1* | 7/2014 | Giacobbe | H04L 67/22 709/204 |
| 2015/0106756 A1* | 4/2015 | Jitkoff | G06F 16/27 715/765 |
| 2015/0134664 A1 | 5/2015 | Lin et al. | |
| 2015/0162000 A1 | 6/2015 | Di censo et al. | |
| 2015/0235135 A1* | 8/2015 | Shastri | G06N 5/02 706/11 |
| 2015/0248222 A1* | 9/2015 | Stickler | G06Q 30/02 715/763 |
| 2015/0293904 A1* | 10/2015 | Roberts | G06F 16/90332 704/9 |
| 2015/0317333 A1 | 11/2015 | Miller et al. | |
| 2016/0132342 A1* | 5/2016 | Yang | G06F 3/04883 715/708 |
| 2016/0132568 A1* | 5/2016 | Vogel | G06F 3/0484 707/728 |
| 2016/0133254 A1* | 5/2016 | Vogel | G06F 3/167 704/275 |
| 2016/0146623 A1 | 5/2016 | Ren et al. | |
| 2016/0210363 A1* | 7/2016 | Rambhia | G06F 16/951 |
| 2016/0306798 A1* | 10/2016 | Guo | G06F 16/93 |
| 2016/0371395 A1* | 12/2016 | Dumant | G06F 16/24575 |
| 2017/0092273 A1* | 3/2017 | Roberts | G06F 16/90332 |
| 2017/0169101 A1* | 6/2017 | Walia | G06Q 30/016 |
| 2018/0150522 A1* | 5/2018 | Moskwinski | G06F 16/00 |
| 2018/0196871 A1* | 7/2018 | Butler | G06F 17/2785 |

OTHER PUBLICATIONS

Hailpern, et.al, "YouPivot: Improving Recall with Contextual Search", In Proceedings of the SIGCHI Conference on Human Factors in Computing Systems, May 7, 2011, 10 pages.

Macdonald, et.al, "On perfect document rankings for expert search", In Proceedings of the 32nd International Acm Sigir Conference on Research and Development in Information Retrieval, Oct. 27, 2016, 2 pages.

Jansen, James, "Using an intelligent agent to enhance search engine performance", In Journal of First Monday, vol. 2, No. 3, Mar. 3, 1997, 9 pages.

* cited by examiner

CONTEXTUAL DOCUMENT RECALL

BACKGROUND

A user may interact with a variety electronic documents via a plurality of devices, and may be faced with the problem of recalling specific documents over multiple sessions. While searching for a particular document at a later time, the user typically has to remember the name of the document to perform the search or look in the history section of the application used. Further, the search results obtained via a keyword search may result in a large number of documents that the user may have to manually open before finding the relevant document. Performing such a search can be time consuming and cumbersome for the user.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed toward providing a management framework to enable users to perform contextual searches for electronic documents based on the context surrounding the interactions with those documents. A management framework provides systems for obtaining a user's contextual data and the user's interaction data from which a Context Graph and an Interaction Graph are created, respectively. The user's contextual data include the various events associated with the user, for example, the times and locations associated with daily tasks (e.g., going to bed, coming back from lunch) or specific life events (e.g., vacations, holidays, meetings, watching a movie, going on a flight). The user's interaction data include the various manipulations of documents, such as, when the user interacted with a particular document, which device was used, the type of interaction (e.g., open, edit, view), etc. The data from the two graphs are correlated and joined into an event graph. The event graph is maintained and stored in a data storage platform, against which contextual queries are run.

Upon receiving a context based natural language query from a user, one or more query elements within the query are identified. For example, the user may want to search for a document that was edited just before watching a particular movie. Based on the identified query elements, the event graph is spanned to identify the matching results. The results may be parsed through a ranking system which may rank the search results based on various criteria, such as, for example, a predetermined score provided by the system. The context based search results are then provided to the user device.

The functionality of the computing devices used to request and provide search queries are improved by employing the present disclosure by expanding the possible criteria by which a user may formulate a search for a relevant document and reducing the computational resources spent on providing results or executing the search.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
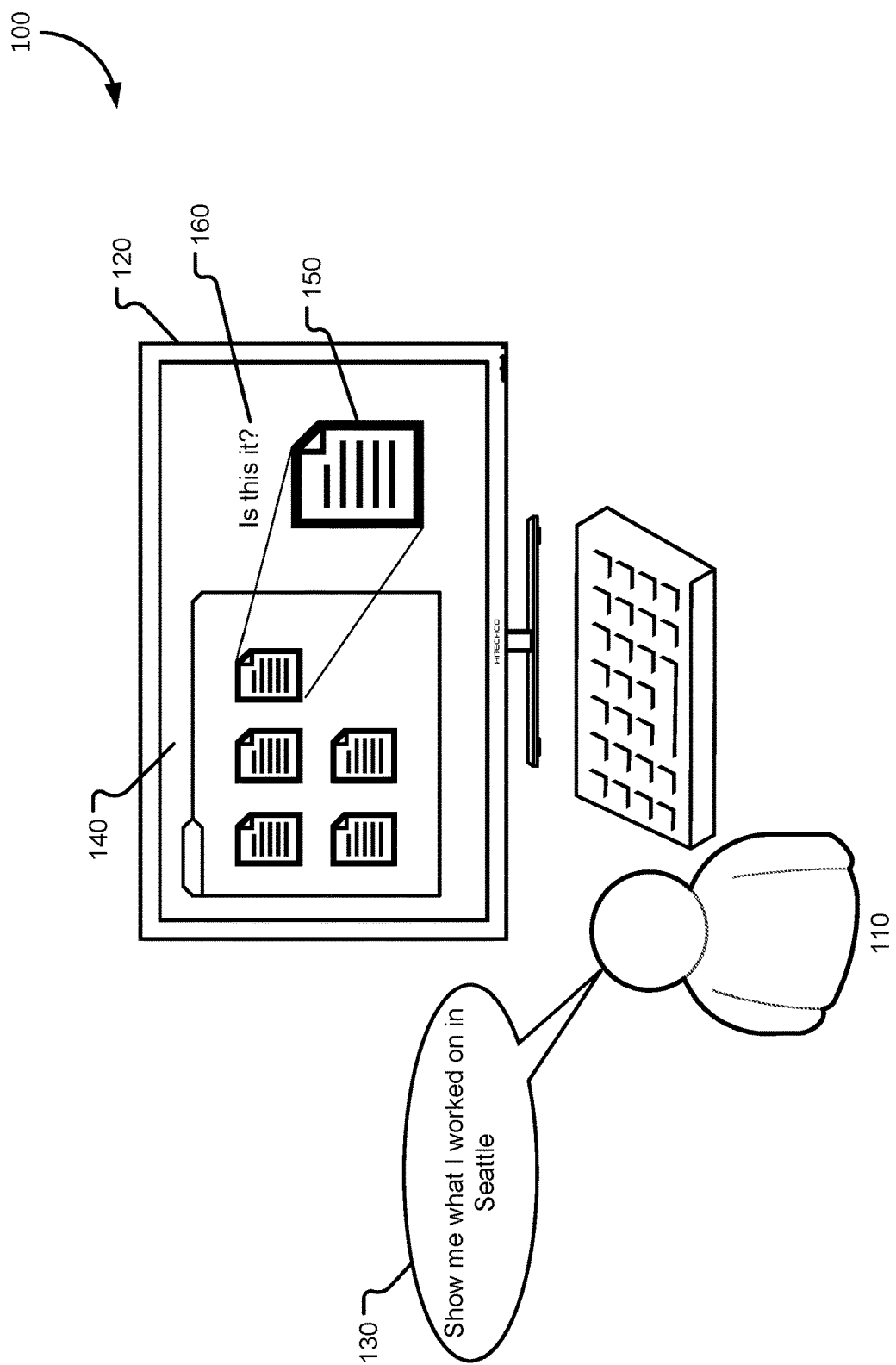
FIG. 1 illustrates an example operating environment in which contextual search may be performed.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

Although examples are given herein primarily in the English language, it will be appreciated that queries may be submitted in various natural languages as well as in structured queries that explicitly specify subjects, objects, and relationships between them. Any example queries given herein are therefore to be understood to provide a non-limiting illustration of example aspects of the present disclosure, which one of ordinary skill in the art will then be enabled to apply to queries containing different words and in different languages.

FIG. 1 illustrates an example operating environment 100 in which contextual search may be performed. A user 110 is enabled to perform a search for a content item 150 by submitting a natural language query 130 on a user device 120. The natural language query 130 is includes contextual cues that are used to define the content item 150 that the user 110 desires to find. For example, as illustrated in FIG. 1, the user 110 submits the request: "Show me what I worked on in Seattle", as a natural language query 130 which includes a locational contextual cue. The user's natural language query 130 requests the content item 150 on which the user 110 worked in "Seattle". In another aspect, more than one contextual cue is included in the natural language query 130. For example, the user 110 may submit the request: "Find the presentation file that I worked on in Seattle" which provides the system with the locational contextual cue of "Seattle" as well as a file type contextual cue of "presentation file". Other contextual cues include, but are not limited to: chronological terms (e.g., yesterday, last week, earlier, after July, between March and June), event names (e.g., Thanksgiving, vacation, the status meeting), personal names and actions (e.g., shared by Tom, received from Dick, sent to Harry), content item properties (e.g., latest version, an earlier version, last opened, parent file, template), etc.

In response to the natural language query 130, an interface 140 is displayed on the user device 120 to the user 110 to showcase the results. As illustrated in FIG. 1, the interface 140 displays the content item 150 that is responsive to the natural language query 130 and a user interaction message 160 of "Is this it?" In other examples, the interface 140 may provide the user 110 with multiple responsive content items 150 as results and various user interaction messages 160, including messages asking for clarification or rephrasing when no content items 150 or too many content items 150 are returned in a search. User interaction messages 160 include visual messages (e.g., text displayed in the interface 140, a results window) as well as audio messages (e.g., spoken dialog, chimes), and combinations thereof.

Figure 2A:
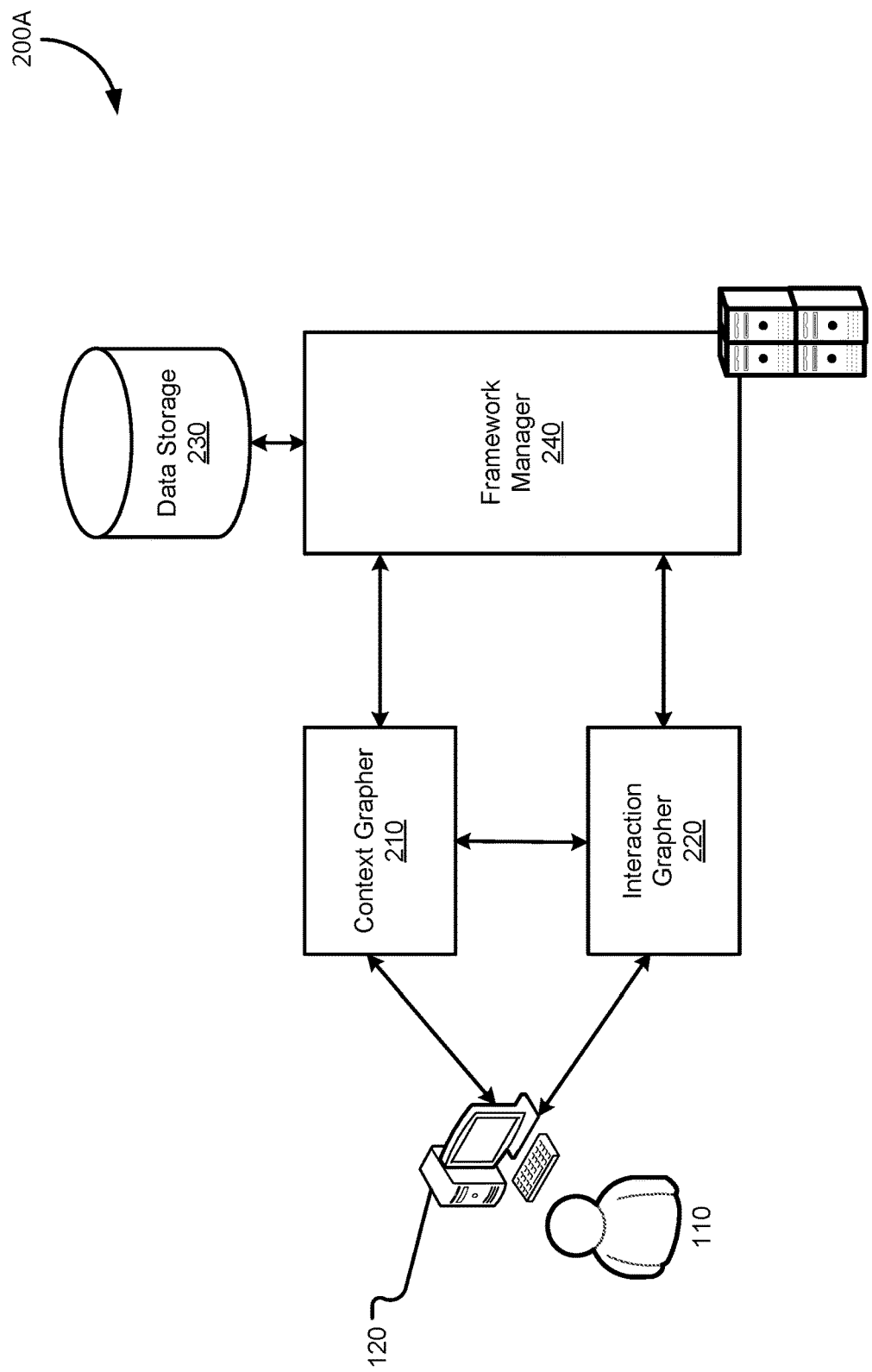
FIGS. 2A and 2B illustrate architectures in which the various aspects of the system may be practiced.
Figure 2B:
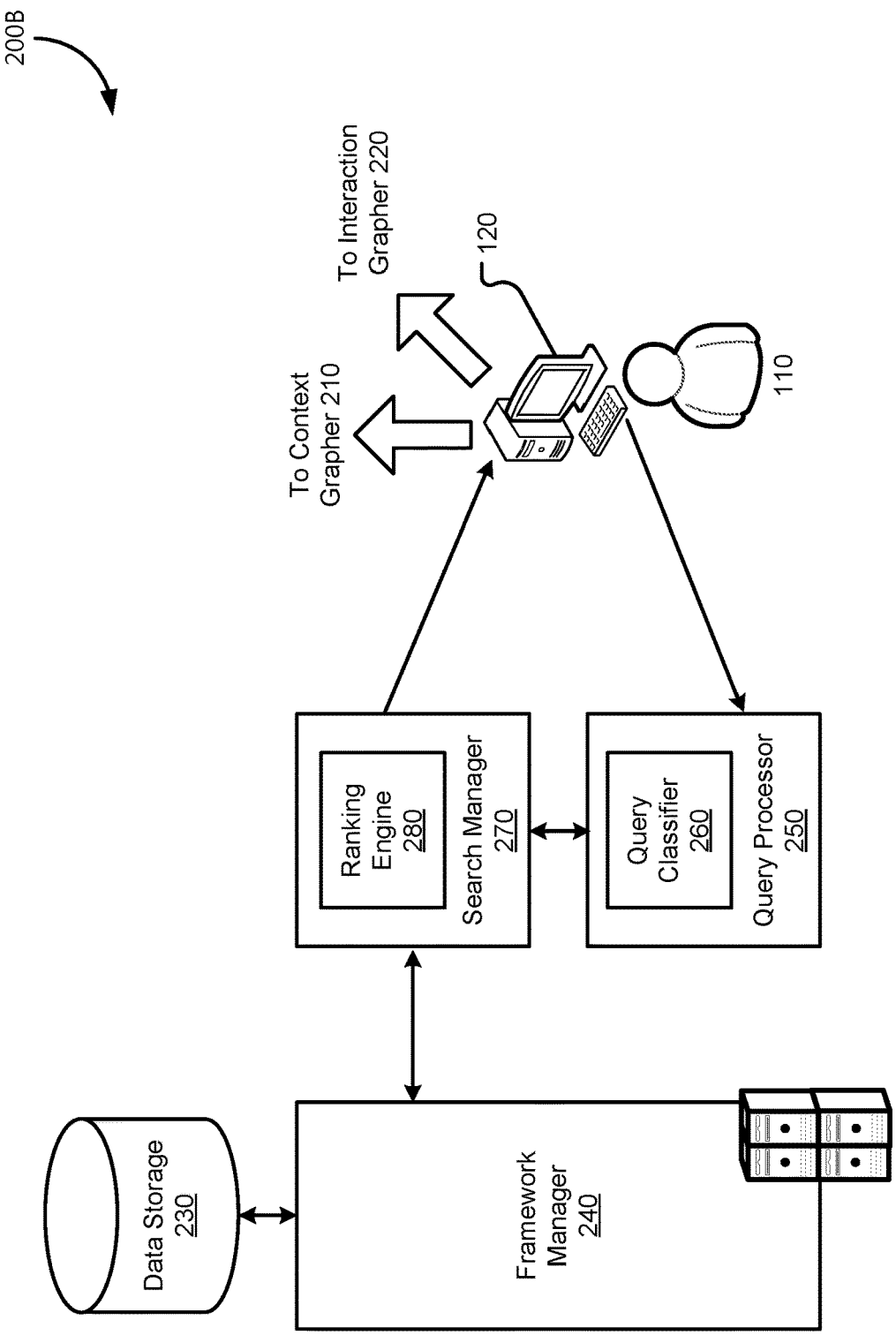

FIGS. 2A and 2B illustrate architectures 200A and 200B in which various aspects of contextual searching may be practiced. Architecture 200A in FIG. 2A provides for the construction of an event graph used in the architecture 200B in FIG. 2B to search according to contextual cues received from natural language queries 130.

As illustrated in FIG. 2A, the user device 120 is in communication with a context grapher 210 and an interaction grapher 220. The context grapher 210 and the interaction grapher 220 collect details about how the user 110 interacts with various content items 150, and are in communication with one another and a framework manager 240. The framework manager 240 builds an event graph from the user's interactions with various content items 150, and stores the event graph in a data storage 230 for use in responding to natural language queries 130.

The context grapher 210 obtains contextual data from various user devices 120 used by a user 110 to create and maintain a context graph. In various aspects the context grapher 210 obtains the contextual data though various systems. The context data identify times and locations for events in the user's life. In one example, the context grapher 210 uses the GPS (Global Positioning System) transceiver of a mobile user device 120 to obtain locational contextual data, which may be mapped to one or more locations (e.g., home, work). In another example, the context grapher 210 parses the user's email and/or text messaging data (e.g., Multimedia Message Service (MMS) and Short Message Service (SMS)) to obtain data regarding any discussions or communications related to events, such as, flight times/destinations, movie titles/times, etc. In a further example, the context grapher 210 parses the user's calendar data to obtain data regarding various meetings the user 110 attended or is/was scheduled to attend. In yet another example, operating system messages (including device activity) and application messages, (including search engine query histories) are used to determine the actions of the user 110 at a given time. As will be appreciated the above examples are non-limiting, and one of skill in the art will be familiar with other signals that can be collected and analyzed to determine life events of the user that can be searched against, and different context graphers 210 may use some or all of the above example contextual data sources. The interaction grapher 220 obtains the user's interaction data with various content items 150 via the user devices 120 to create and maintain an interaction graph. In one example, as the user 110 interacts with various word processor documents, presentation documents, image files, audio files, multimedia files, electronic mails, websites, etc., via the user devices 120, the interaction grapher 220 obtains that information. These interaction data include the times in which content items 150 were manipulated (opened, closed, edited, saved, received, transmitted, shared, etc.), the device and/or programs used to manipulate the context items 150, and the locations of the device when the content items 150 were manipulated (e.g., while at home, while at the office). In another aspect, the duration of interaction with the various documents is also obtained by the interaction grapher 220. For example, the interaction grapher 220 obtains timestamp data regarding when the user 110 manipulated a given content item 150 and correlates a first interaction (e.g., an open) with a last interaction (e.g., a close, a last edit before a close) for the given content item 150.

The framework manager 240 receives the context graph provided by the context grapher 210 and the interaction graph provided by the interaction grapher 220. The framework manager 240 is configured to correlate and join the two graphs to create an event graph, and to store the event graph in a data storage 230 for later access in response to updates to the context graph or interaction graph and/or queries to the event graph. The interaction data are joined with the contextual data in the event graph to enable a user 110 to submit queries related to life events that correspond to document interactions, such that a user 110 can locate one or more documents based on other activities the user 110 was engaged in relative to interacting with the documents. The search functionality for documents is thereby expanded from file path and filename searches. For example, a user 110 may submit queries for "show me the document I worked on before watching 'The Jungle Book'" or "show me the document I worked on after watching 'Pride and Prejudice'" and have the desired document returned based on the interaction data being joined to the context data in the event graph. As will be appreciated, contextual search via the event graph may be performed in addition to, instead of, or in conjunction with name of file path based searches.

The event graph uses shared temporal and locational features between the interactions noted in the interaction graph and the events noted in the context graph to link the content items 150 with the events surrounding their interactions. These relations include, but are not limited to, interactions occurring before/after/during an event and interactions with a first content item occurring before/after/during interactions with a second content item. In various aspects, relationships related to "before" or "after" an event or co-interaction may include time gradients, such that events occurring within n minutes of the event or interaction referenced for the relationship are given greater weight in returning search results than events occurring within n+1 minutes. To illustrate, consider the user 110 who has interacted with two content items 150—one on Monday and one on Tuesday—before taking a trip to Paris. If the user 110 were to submit a query for "what documents did I work on before my trip to Paris", both content items 150 may be returned, or only the content item 150 interacted with on Tuesday, as it is temporally closer to the referenced event (i.e., the trip to Paris on Wednesday).

The framework manager 240 is operable to handle shared namespaces for contextual and interaction data when building or searching the event graph. In one aspect, different names for the same event or interactions are conflated to enable natural language queries to be handled. For example, a user 110 may request the same content item 150 via a first query of "what document did I work on before bedtime yesterday" and a second query of "what document did I edit before going to bet last night"; the different choices in query terminology are conflated to account for the same underlying meaning. In another aspect, granular tasks or locations are aggregated to enable synecdoctic search. For example, a user 110 may query for a given content item via a query of "what document did I work on in California" or by the name of the specific city in California, the specific location in the city, etc. In a further aspect, contemporaneous or co-located actions are ranked to return the most likely content items 150 to respond to the user's query first. For example, a user 110 may have several documents open at a given time (and while located at a given location), and when querying for the document interacted with at a given time/location, will have one or more of those documents returned based on their ranking relative to one another.

As illustrated in FIG. 2B, a query processor 250 is in communication with the user device 120 to receive and process natural language queries 130 via a query classifier 260, to classify data in the natural language query 130 into elements by which to search. A search manager 270 is in communication with the query processor 250 to receive the one or more query elements provided by the query processor 250 and perform a contextual search in the event graph, via the framework manager 240 based on the query elements. The search manager 270 is further operable to receive the search results and provide them to the user device 120 in a sorted ranking determined by a ranking engine 280. In various aspects, the ranking engine 280 is operable to rank and sort the results based on a predetermined threshold score associated with each search result, based on the relevancy of the search result to the query elements provided by the query processor 250 to perform the search.

The query processor 250 is configured to receive a query for a content item 150 from the user 110 and build a graph query to execute on the event graph. In various aspects, the user 110 submits a natural language query 130 that the query processor 250 parses to determine the identities and relationships between terms submitted by the user 110. For example, a user 110 may submit a natural language query 130 as an audible request from which the query processor 250 will extract various words based on their phonemes. In various aspects, the query processor 250 provides an interface to the user 110 and the query classifier 260, which may be hosted locally or remotely to the query processor 250 (e.g., in a cloud-based data processing facility) is transmitted the phonemes or text of a natural language query 130 to determine the elements of the query and their interactions.

Adaptive ranking mechanisms are used in various aspects to provide more relevant results based on how the user 110 interacts with the query results via one or more machine learning approaches. For example, if a user 110 frequently queries for "show me the document I worked on at home", and the user accepts word processor documents, and rejects spreadsheet documents and presentation documents, the adaptive ranking mechanisms will promote word processor documents and/or deprecate non-word processor document in the query results. The interactions between the user device 120 and the query processor 250 are therefore used to improve the functionality of the query processor 250 over time, and are collected by the context grapher 210 and interaction grapher 220 as additional contextual and interaction data.

The query processor 250 is operable to translate the natural language query 130 from the user 110 into a graph query according to various query languages. One of ordinary skill in the art will be familiar with various query languages, which include, but are not limited to: SQL (Structured Query Language), GQL (Graph Query Language), FQL (Facebook Query Language), Cypher, etc. In various aspects, if a confidence for the identity of a word or a relationship in the translation does not satisfy a confidence threshold, the query processor 250 is configured to request for the user 110 to provide additional details, to repeat or rephrase the natural language query 130, or to alert the user 110 that the query (as it is understood) is not valid. In additional aspects, the query processor 250 may rephrase the query, as it understands it, to present to the user 110 and request permission before the query is transmitted to the search manager 270 for execution.

In various aspects, the query processor 250 is operable to associate various locational information to hubs or names assigned by the user 110. For example, over time the query processor 250 learns that the GPS coordinates for X/Y or the IP address of aaa.bbb.ccc.ddd is associated with names of "home" or "work" or "the coffee shop", for example, so that a natural language query 130 that includes these names will be associated with locational information stored as latitude and longitude coordinates, IP addresses, network names, or the like. Similarly, a level of approximation may be incorporated into the queries by the query processor 250 when translating natural language queries 130. For example, a city name may be used as a hub to relate to its suburbs and outlying areas or similar names/roles of individuals may be used in a query.

The search manager 270 is configured to receive the translated graph query from the query processor 250 and manage the presentation of the query results. The elements of the query, and their relationships according to the user input, are transmitted to the framework manager 240 to traverse the event graph to identify a content item 150 based on the context by which the content item 150 was interacted with.

The search manager 270 receives the results of the graph query from the framework manager 240, which may include identifiers for individual content items 150 that satisfy the graph query or a subgraph of the event graph (representing a view responsive to the graph query). Depending on the number of resulting content items 150, the ranking engine 280 may order the results according to one or more ranking schemes, that include, but are not limited to: a length of interaction with a content item 150 (e.g., a user 110 may be more interested in the document interacted with for several hours than the document opened and closed soon thereafter), a temporal proximity (e.g., a user 110 may specify a document interacted with before/after a given contextual reference point, but is interested in the one document interacted with closest in time to the reference), a level of approximation for a locational relationship or interaction type (e.g., a user 110 may state the name of a city in which a document was worked in, but the locational features identify a suburb of that city or a user 110 may misstate a name of another person from whom the desired document was shared with), a confidence score from the framework manager 240 in the given content item matching the graph query, and combinations thereof.

In various aspects, when the number of content items 150 falls below a result threshold (e.g., no results are returned) or exceeds a result threshold (e.g., too many results are returned), the search manager 270 is configured to alert the user 110 of the result threshold not being satisfied, and request additional input from the user 110. For example, when no results are returned, the user 110 may be alerted of such, and prompted to rephrase the natural language query 130. In another example, when no results are returned, the search manager 270 may return the closest matches or suggest different contextual links from a subgraph that may return results. To illustrate, the search manager 270 may prompt the user 110: "Your query for documents worked on in Seattle returned no results—do you want me to retry and look for documents worked on in Washington state or would you like to rephrase your query?". When too many results are returned, the user 110 is alerted of such, and may be prompted to return the large number of results or provide additional contextual elements to refine the results. To illustrate, the search manager 270 may prompt the user 110: "Your query for documents worked on in Seattle returned too many results—you were in Seattle for three days—would you like the results for Monday, Tuesday, or Wednesday?". In another illustration, the search manager 270 may prompt the user 110: "Your query for documents worked on in Seattle returned too many results—you are frequently in Seattle—is there a date range, special event, or document type that I can use to refine the results for you?".

In another aspect, ambiguities in the natural language query 130 are handled by the query processor 250 and the search manager 270 via prior user responses to queries, available data in the event graph, a third-party search engine, or a secondary query to the user 110. For example, a user 110 may submit a query of "What document did I work on while I was in Washington", which is ambiguous due to the user 110 potentially meaning "Washington State" or "Washington D.C." In a first aspect, when prior user selections or rejections are available for queries related to an ambiguous term, like "Washington", those results are used to determine the meaning of the ambiguous term. In a second aspect, the available data in the event graph are used to determine the meaning of the ambiguous terms, such that, for example, if the user has never been to "Washington D.C." but has been to "Washington state" according to the event graph, "Washington State" will be selected as the meaning of the term. In a third aspect, a search engine will be used to provide meaning to the ambiguous term, such as, for example, using the first result from the search engine to resolve the ambiguous term. For example, a user 110 may frequent a chain of restaurants, and include that chain's name in a query, which a search engine may resolve to the closest restaurant of that chain, which will have its location coordinates used to locate related content items 150 according to the event graph. In a fourth aspect, when the meaning of an ambiguous term cannot be resolved via another means (to satisfy a confidence score in its meaning), a clarification request is generated and transmitted to the user device 120 to ask the user 110 to provide clarification as to the meaning of the ambiguous term, rephrase the query, or to submit a different query.

In various aspects, the query processor 250 and the search manager 270 are integrated into, or are in communication with the user 110 via, a personal assistant application running on the user device 120. For example, the SIRI®, ALEXA®, or CORTANA® personal digital assistants (available from Apple, Inc.; Amazaon.com, Inc.; and Microsoft Corp.; respectively) may be used to process natural language queries 130 from the user 110 and manage the presentation of the query results on the user device 120.

In one example, the data regarding which result was chosen by the user 110 is received by the context grapher 210 illustrated in FIG. 2A as context data. In one aspect, if only one result is received by the search manager 270 to be provided to the user device 120, the search manager 270 is further operable to open the content item 150 and provide it to the user device 120.

The user device 120, context grapher 210, interaction grapher 220, data storage 230, framework manager 240, search manager 270, and query processor 250 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5-7.

While the user device 120, context grapher 210, interaction grapher 220, data storage 230, framework manager 240, search manager 270, and query processor 250 are shown remotely from one another for illustrative purposes, it should be noted that several configurations of one or more of these devices hosted locally to another illustrated device are possible, and each illustrated device may represent multiple instances of that device (e.g., the user device 120 may represents multiple devices used by the user 110). Various servers and intermediaries familiar to those of ordinary skill in the art may lie between the component systems illustrated in FIGS. 2A and 2B to route the communications between those systems, which are not illustrated so as not to distract from the novel aspects of the present disclosure.

Figure 3:
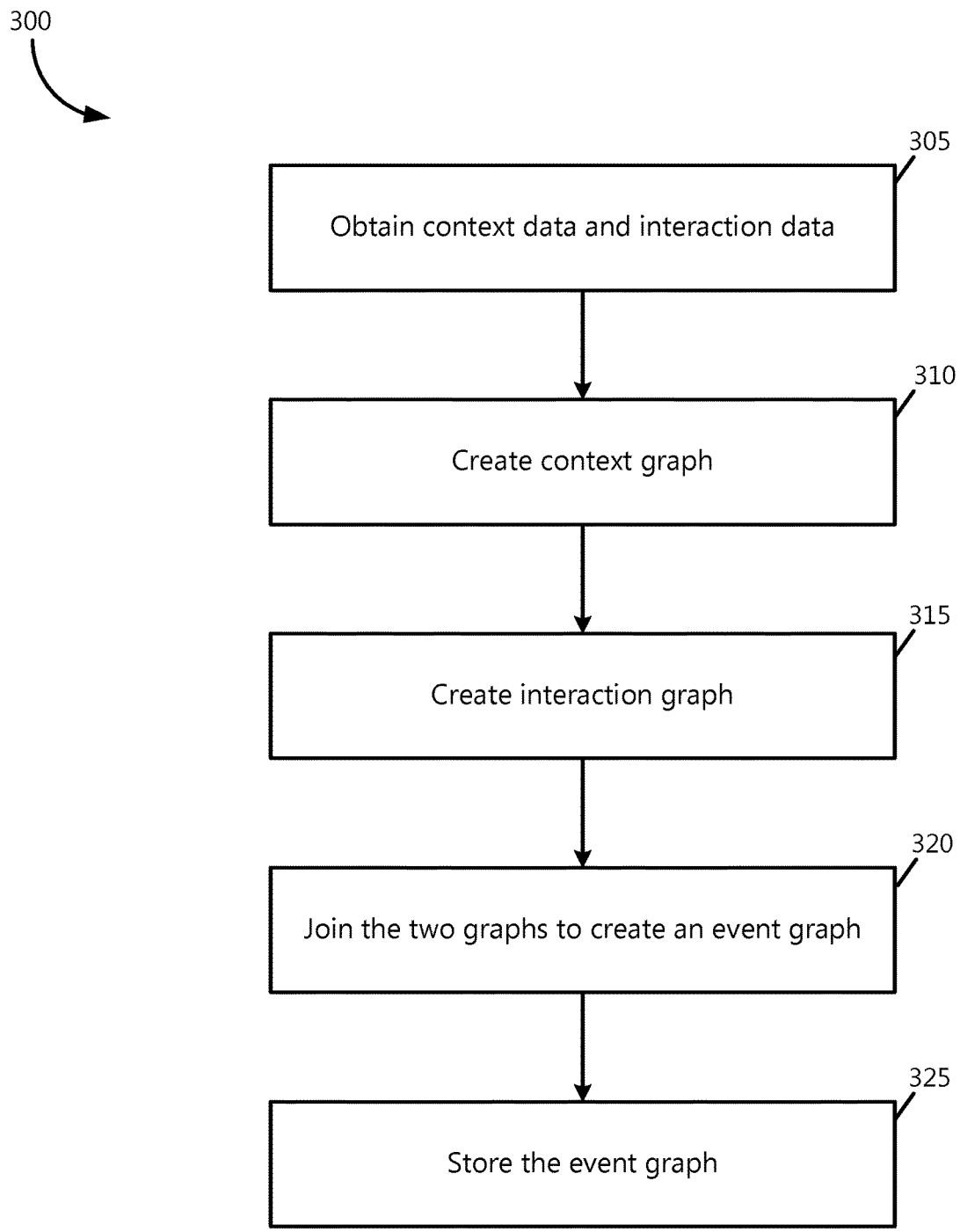
FIG. 3 is a flowchart showing general stages involved in an example method for creating an event graph for providing enhanced contextual search.

FIG. 3 is a flowchart showing general stages involved in an example method 300 for creating an event graph for providing enhanced contextual search. Method 300 begins at OPERATION 305, where contextual data and interaction data are gathered for the user 110. Contextual data include the times and locations at which events occur for the user 110. In various aspects, events are discovered in calendar applications, parsed from messages (e.g., an email including details of a ticket for a flight, event, a text confirmation of an event, etc.), positioning systems of a user device 120 (e.g., noting GPS coordinates mapped to a given city, organization's building, park, campus location, etc.), device actives (e.g., using device A or device B) application events (e.g., search engine queries, application crashes), etc. Interaction data include the times and locations at which a user 110 manipulated a content item 150. In various aspects, manipulations are discovered based on triggers occurring in applications in which manipulate content items 150, such as, for example, an open command, a close command, a save command, input commands, etc.

In various aspects, the times for the events and manipulations are gathered based on the internal clock of the user device 120 at the time the event or manipulation is observed (e.g., in response to a geolocation changing, a manipulation being observed), as parsed from an email (e.g., text extraction of an email confirming a flight time), or from a calendar application (e.g., using the scheduled times for meetings or out-of-office notifications). Similarly, the locations for the events and manipulations are gathered according to positioning systems of the user device 120, geolocation services (e.g., an IP address geolocation service), known network/connectivity locations (e.g., associating a first network with "home" and a second network with "work"), parsed locations from emails (e.g., text extraction of an email confirming a flight destination), or from a calendar application (e.g., using the scheduled locations for meetings).

At OPERATION 310 a context graph is created based on the contextual data, and at OPERATION 315 an interaction graph is created based on the interaction data. The context graph details various contexts surrounding events based on locations and times and relationships between those contexts. The interaction graph details relationships between content items and how they have been interacted with. Various properties are maintained in the graphs, such as, for example, the times, durations, locations, relative orders (e.g., which context or interaction occurred before a different event or interaction), the source of the context/interaction, the name of the event or document interacted with, a type of the event or document interacted with, whether other users (and their identities) were present at the event, a file path of the document interacted with, whether the document interacted with was received from, shared with, or sent to other users (and their identities), etc.

Proceeding to OPERATION 320, the context graph and the interaction graph are joined to create an event graph. The time and locations in each of the context graph and the interaction graph are used to find and establish relationships between various contexts and interactions with documents. In various aspects, time based relationships use overlapping durations (e.g., first time at the location until last time at the location compared to open interaction time until close interaction time). To illustrate a time relationship, consider a natural language query 130 of "provide the document I was working on at the coffee shop", which relies on a relationship between the location of "coffee shop" and the "document [the user] was working on" based on time. Examples of time based relationships include relative times (e.g., the first document I worked on yesterday), specified times (e.g., the document I was working on at noon), antecedent contexts/interactions (e.g., the document I worked on before the meeting, the document I worked on before sending the email to Alice), concurrent contexts/interactions (e.g., the document I worked on during the meeting, the document I worked on while listening to playlist A), and subsequent contexts/interactions (e.g., the document I worked on after the meeting, the document I worked on after I received the email from Bob).

At OPERATION 325 the event graph is stored in the data storage 230. In various aspects, the event graph is stored with various privacy controls for the user 110, so that an individual may not access the event graphs (or portions thereof) created for other individuals without permission. Method 300 may then conclude or repeat as necessary to build an event graph of the user's interactions and associated content.

Figure 4:
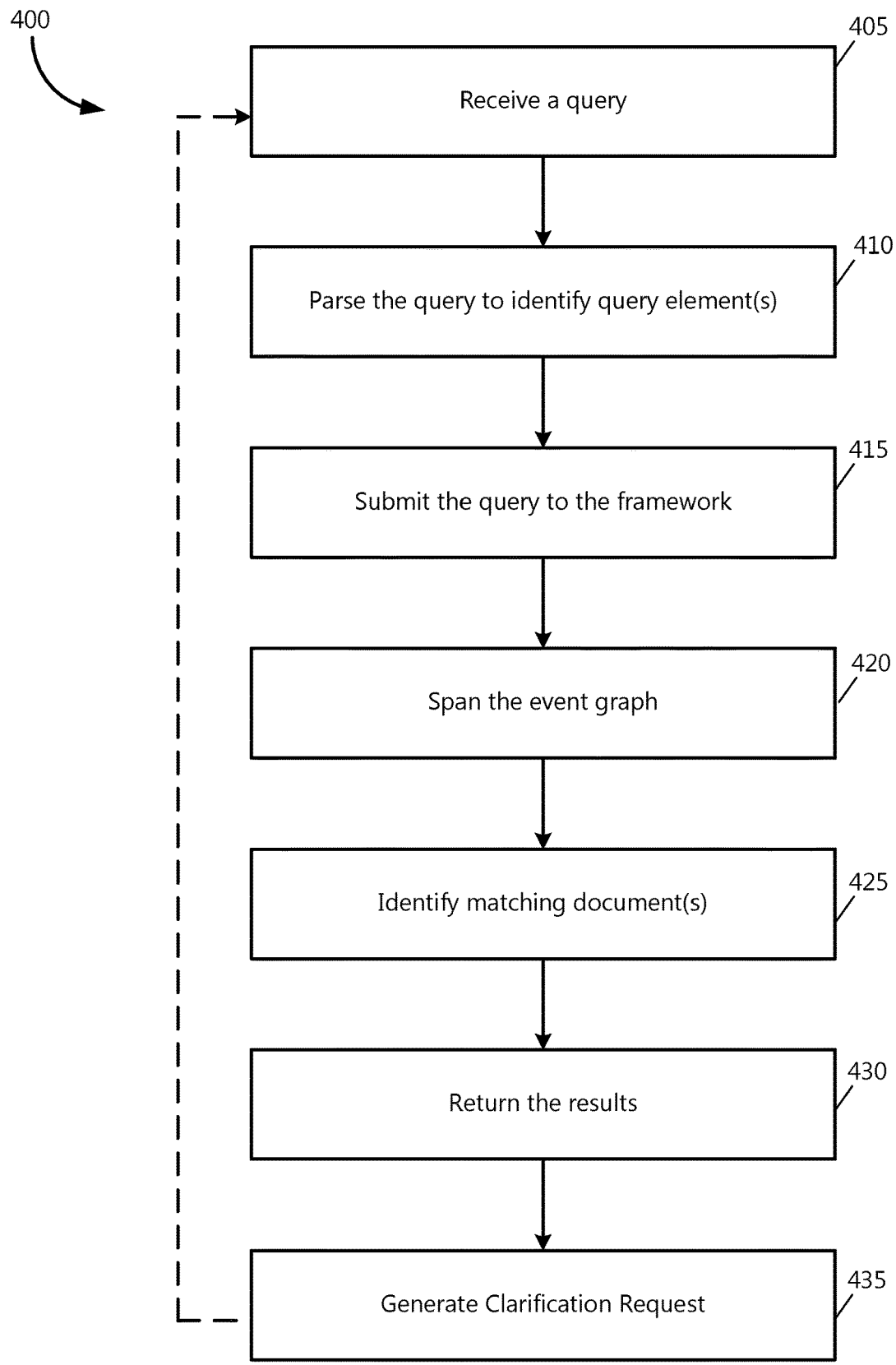
FIG. 4 is a flowchart showing general stages involved in an example method for providing enhanced contextual search.

FIG. 4 is a flowchart showing general stages involved in an example method 400 for providing enhanced contextual search. Method 400 begins at OPERATION 405, where a query is received from a user device 120 that includes contextual cues. In various aspects, contextual cues include location names (e.g., Seattle, the office, the airport), event names (e.g., the meeting, the Nutcracker, Thanksgiving), time identifiers (e.g., noon, yesterday, last Tuesday), document types (e.g., spreadsheet, presentation), version identifiers (e.g., the track changes version, the latest version, the third draft), file paths (e.g., from my thumb drive, from my cloud storage solution, received as an email attachment), interaction types (e.g., saved, opened, worked on/edited), relative markers (e.g., before, during, while, after).

At OPERATION 410, the query is parsed to identify query elements, including identifiers for objects, terms, and cues. The contextual cues are parsed from the natural language query 130 to identify what content item 150 the user 110 desires to retrieve based on the context of that content item 150. In various aspects, different natural language parsers are used, which may be tuned to the vocal patterns of a user 110 if the query is audibly received, and may be tuned to the vocative patterns of the user 110, so that different terms are associated with various contexts, interactions, events, and content items 150 used to identify them. For example, two users 110 with different accents may refer may refer to the same cue with the same word, but with different phonemes that the natural language processor will learn to identify with the user's vocal patterns. To illustrate, consider the query of "show me the website I visited while in Atlanta" in which the city of Atlanta is pronounced as [At-lan-ta] or [At-wan-ta] (with a dropped 'l' in the second pronunciation) that the natural language processor will associate with the node for "Atlanta" based on the user's learned vocal patterns (e.g., an accent or speech impediment). In another example, a first user 110 may refer to a word processing document as a "doc", as in "open the doc I was working on yesterday", whereas a second user may refer to a word processing document as a "paper", as in "open the paper I was working on yesterday". The vocal patterns and vocative patterns of various users 110 are tuned to those users 110 according to machine learning and reinforcement learning techniques so that as the user 110 makes queries and responds to those queries (opening a content item 150, rejecting query results, refining a query, submitting a second query, etc.), the habits of the user 110 are learned to provide more accurate results in the future.

The query elements are extracted from the query and the grammatical functions of the various elements may be determined based on their identities and orders in a natural language query 130 or via markers in a structured query. For example, the natural language queries 130 of "find the document John shared with me" and "find the document I shared with John" include all the same query elements, but the structure of the query (based on natural language grammar) differs so that the content item 150 returned by the query may also differ. In another example, verbs and prepositions are identified relative to noun-pairs to identify subjects and objects of a natural language query 130, such that "the document I sent to John" may be differentiated from "the document I received from John" based on "sent/received" and "to/from" when developing a relationship to comparing the nouns in the natural language query 130.

Proceeding to OPERATION 415, the query elements are submitted to the framework manager 240, and at OPERATION 420 the event graph stored in the data storage 230 is spanned to discover elements matching the query elements at OPERATION 425. In various aspects, identities of various nouns are associated with nodes in the event graph and the relationships between those nouns identified in the query are associated with edges in the event graph between those nodes. The query elements specific, in various aspects, node properties (e.g., document types, interaction names, event names, names of persons), edge types (e.g., shared with, worked on at, open concurrently), and edge strengths (e.g., worked on the longest during a time range or at a location). These node properties, edge types, and edge strengths extracted from the query determine how the event graph is spanned and the nodes from which it is spanned.

For example, the query "what were the presentation files that I worked on last week?" specifies that nodes representing "presentation files" that are related to (i.e., share an edge with) nodes representing the temporal context of "last week" are to be returned. In another example, the query "what was the spreadsheet I was working on in Kalamazoo?" specifies that nodes representing "spreadsheet" files that are related to (i.e., share an edge with) nodes representing the locational context of "Kalamazoo" are to be returned. In a further example, the query "open the document I last worked on" specifies the temporal node representing "now" is to be traversed backwards in time until a temporal node related to a node representing a document interaction is discovered to return the document interacted with.

At OPERATION 430, the results are returned to the user device 120 from which the query was received. In some aspects, the results are provided as a listing of responsive documents to the query, as an answer to the query (e.g., "You worked on document X on Monday while in Seattle"), as a view of the relational graph. In aspects where multiple responsive content items 150 are provided, a ranking engine 280 may order those content items 150 according to a confidence score, which may be based on a strength of an edge between the contextual and the interaction nodes in the event graph. In aspects where one responsive content item 150 is provided, an application associated with that content item 150 may be opened to provide an instance of the content item 150 to manipulated further by the user. Method 400 may conclude after OPERATION 430, or proceed to OPERATION 435 when no content items 150 were retrieved, a number of content items retrieved exceeds a threshold, or a method for determining a confidence score has not been selected.

At OPERATION 435 a clarification request is generated and provided to the user device 120. A clarification request provides a prompt to the user 110 to respond to that will provide the search manager 270 with new or additional details to run a different or refined search. For example, a clarification request may state: "I am sorry—no results were found that match your query—please rephrase your query", "Over n results were returned, do you remember any additional details that can refine your query?", "I have searched for x and have found a result. Is this what you meant to search for?", or the like. Depending on the response (or lack thereof) from the user 110, method 400 may conclude or return to OPERATION 410 in response to receiving a query (new or a refinement to an existing query). For example, when multiple candidate results are returned for a query (e.g., exceeding a results threshold), a clarification request may request additional details from the user 110 regarding the given event the user 110 is interested in, which are received as a supplemental query that will span the subgraph produced for the original query, to produce a subset of the results in light of new cues or pivots provided in the additional details of the supplemental query.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
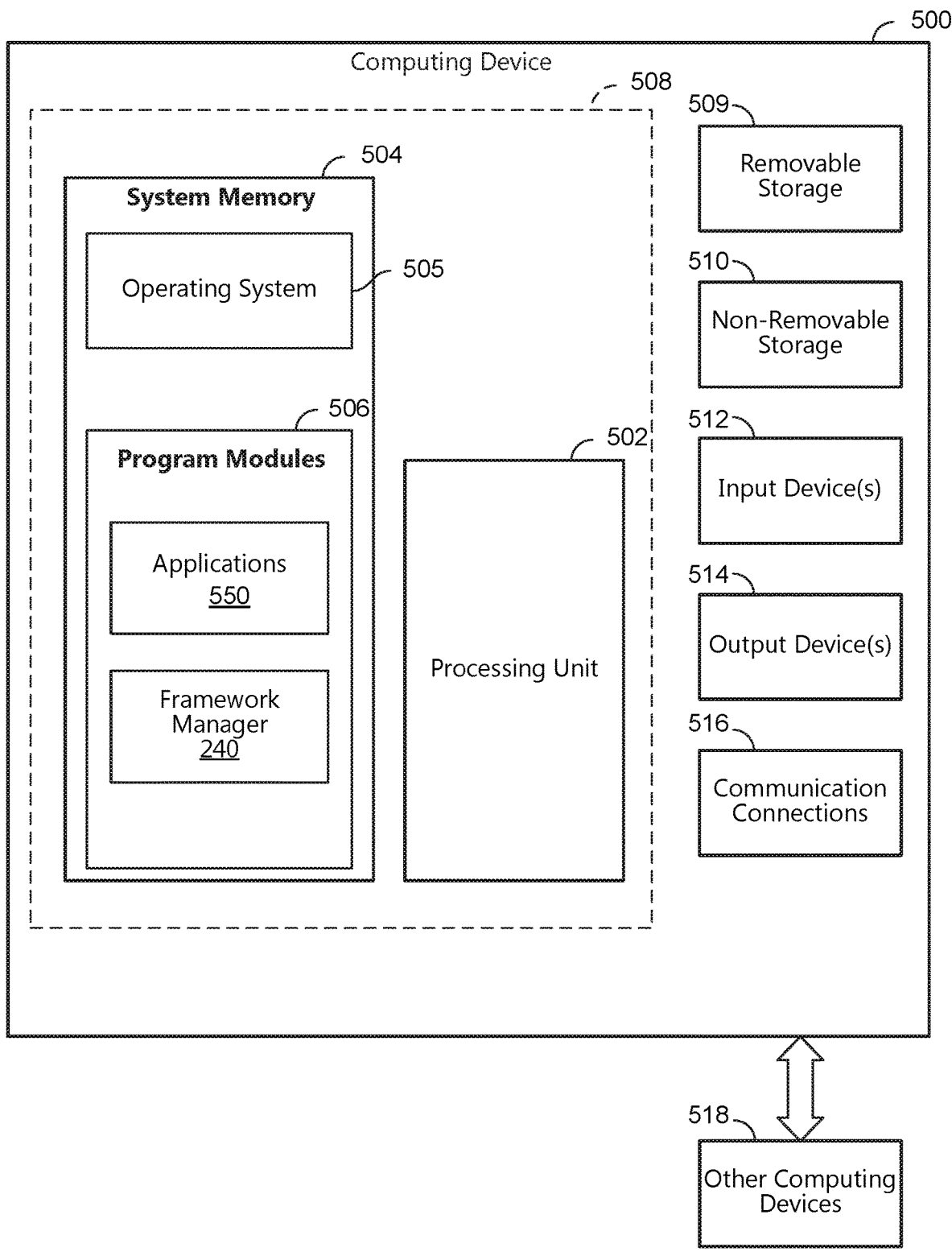
FIG. 5 is a block diagram illustrating example physical components of a computing device.
Figure 6A:
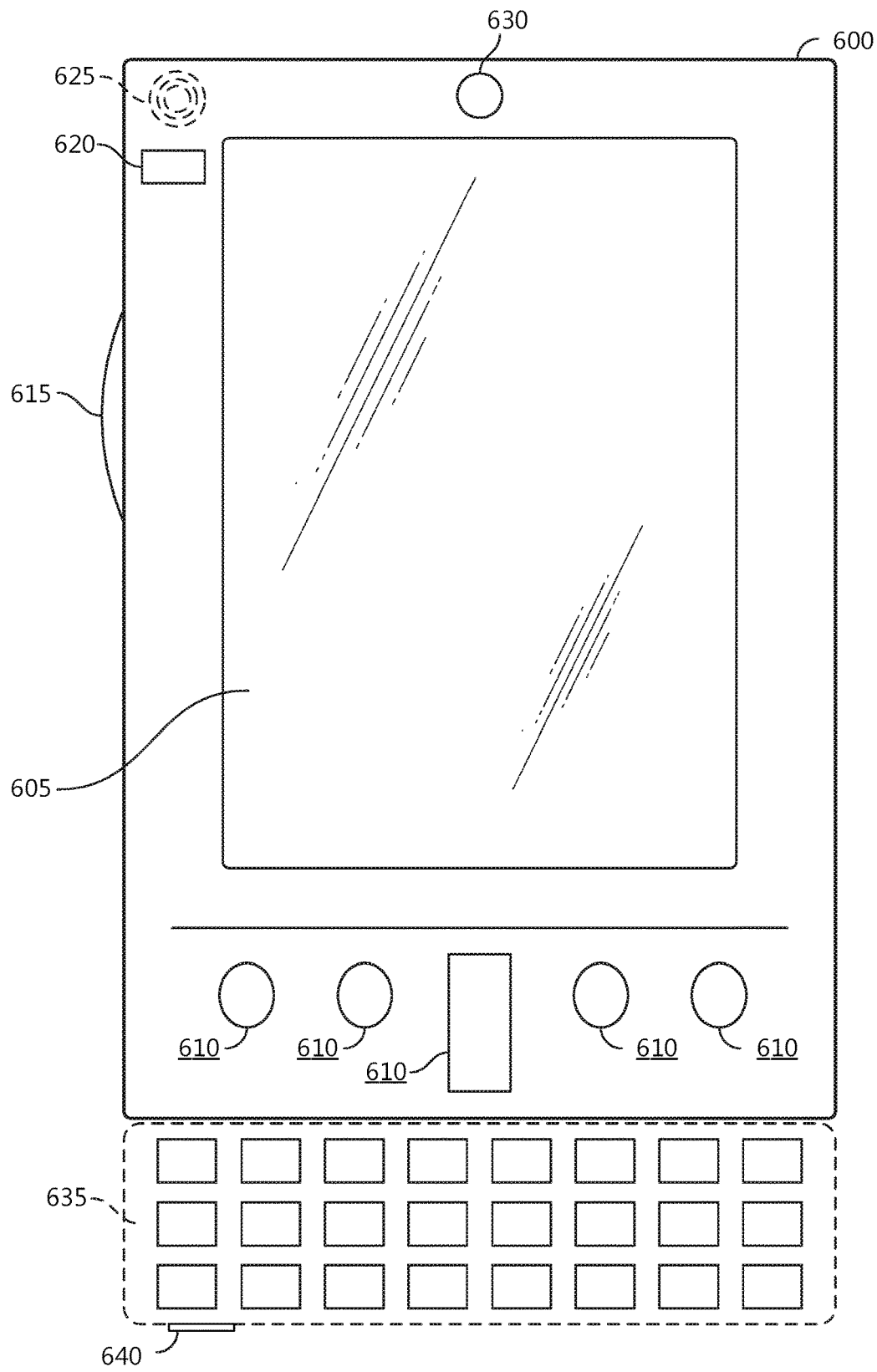
FIGS. 6A and 6B are block diagrams of a mobile computing device.
Figure 6B:
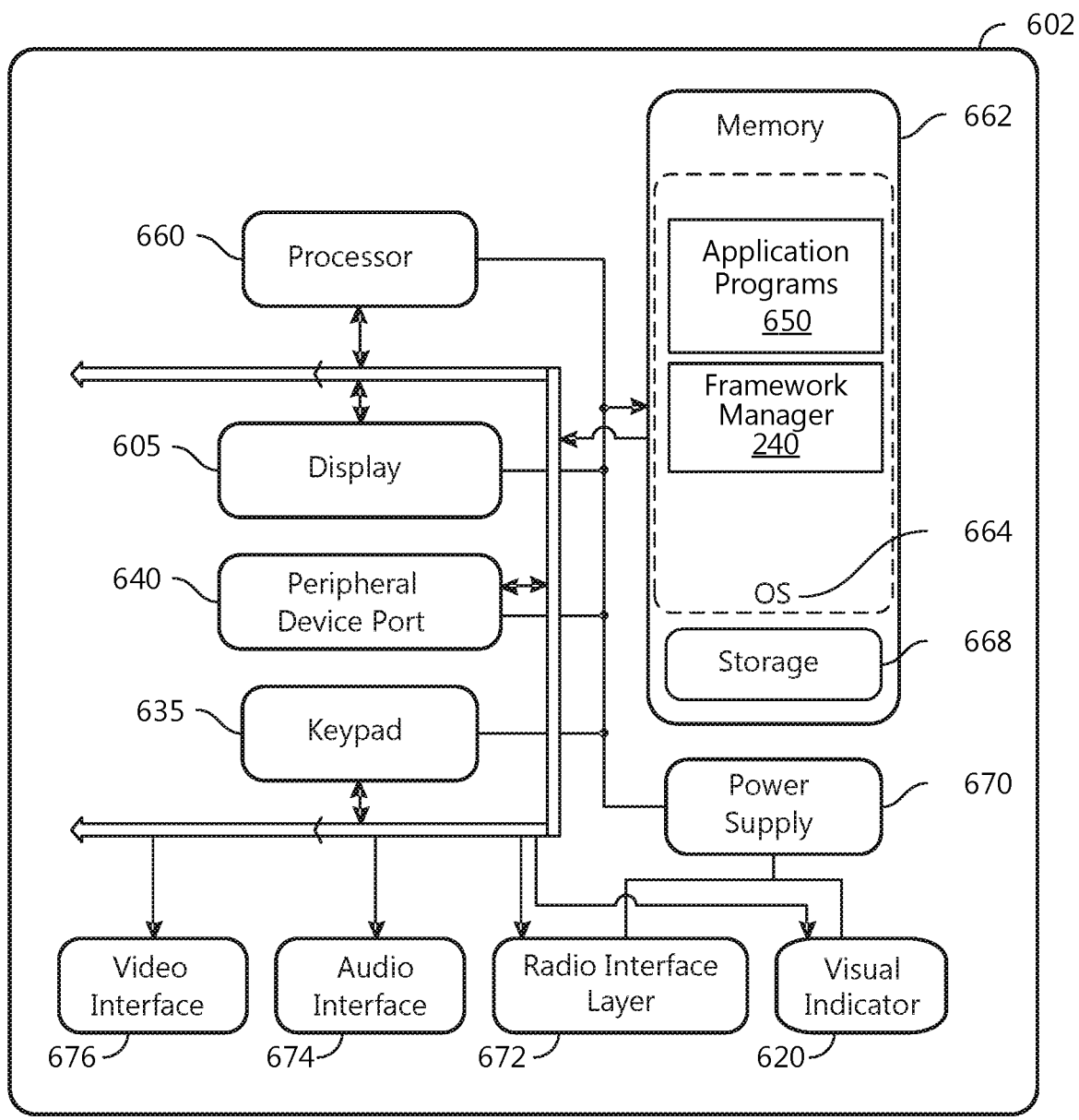
Figure 7:
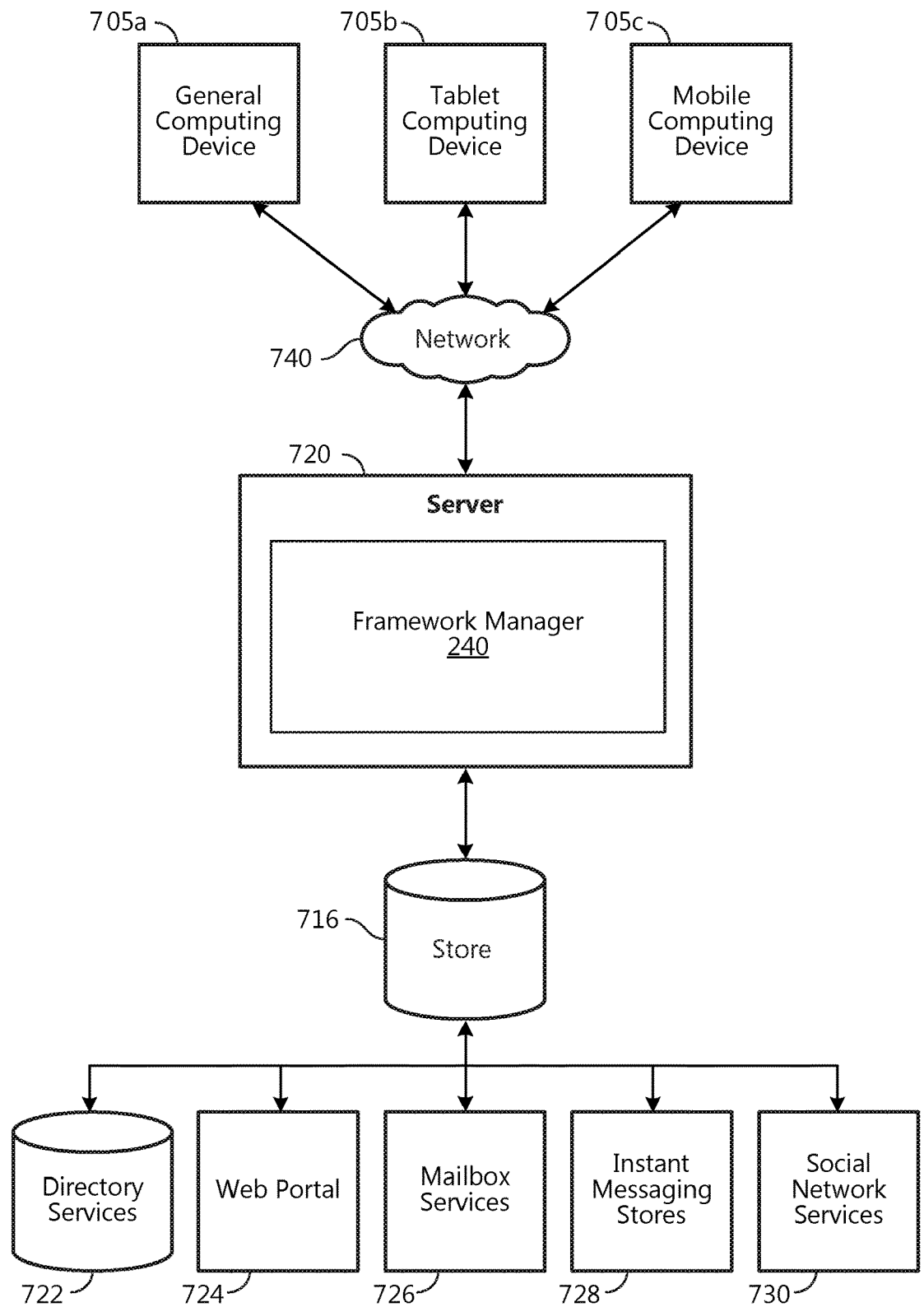
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the framework manager 240. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., framework manager 240)

perform processes including, but not limited to, one or more of the stages of the methods 300 and 400 illustrated in FIGS. 3 and 4. According to an aspect, other program modules are used in accordance with examples and include applications 550 such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for managing contextual queries as described above. Content developed, interacted with, or edited in association with the framework manager 240 is enabled to be stored in different communication channels or other storage types. For example, various documents may be stored using a directory service 722, a web portal 724, a mailbox service 726, an instant messaging store 728, or a social networking site 730. The framework manager 240 is operative to use any of these types of systems or the like for managing contextual queries, as described herein. According to an aspect, a server 720 provides the framework manager 240 to clients 705a, b,c. As one example, the server 720 is a web server providing the framework manager 240 over the web. The server 720 provides the framework manager 240 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing enhanced contextual search, comprising:
   creating a context graph of relationships between user events based on event locations and event times;
   creating an interaction graph of relationships between content items manipulated by a user based on manipulation locations and manipulation times;
   identifying shared times between the event times and the manipulation times and shared locations between the event locations and the manipulation locations;
   creating an event graph of relationships between the user events and the content items by combining the context graph and the interaction graph based on the shared times and the shared locations;
   receiving a first contextual query to the event graph for a first content item, the first contextual query referencing a first event; and
   returning the first content item based on a relationship in the event graph between the first content item and the first event.

2. The method of claim 1, wherein a content item includes one of:
   a word processor file;
   a spreadsheet file;
   a presentation file;
   a website;
   an image file;
   an audio file;
   a video file;

an electronic calendar entry; or
an email.

3. The method of claim 1, wherein a manipulation of a content item includes:
opening the content item;
closing the content item; or
saving the content item.

4. The method of claim 1, wherein a relationship between a user event and a content item includes:
the content item being manipulated at a shared time relative to a user event occurring; or
the content item being manipulated at a shared location with the user event.

5. The method of claim 1, further comprising:
requesting additional detail regarding the first event;
receiving the additional detail regarding the first event; and
selecting, based on the additional detail, one of the multiple candidate content items as the first content item.

6. The method of claim 1, wherein the first contextual query is a natural language query, and wherein receiving the first contextual query for the first content item further comprises:
parsing the first contextual query for contextual cues related to the first event.

7. The method of claim 1, wherein a second contextual query referencing a second event does not return a result, the method further comprising:
generating a clarification request requesting contextual cues regarding the second event.

8. The method of claim 7, wherein a contextual cue includes one of:
a chronological term;
a locational term;
an interaction type;
an interaction target; or
a file type.

9. The method of claim 1, wherein contextual data regarding user events and interaction data regarding content items are obtained from multiple devices associated with the user.

10. A system for providing enhanced contextual search, comprising:
a processor; and
a memory storage device, including instructions that when executed by the processor are operable to cause the system to:
create a context graph of relationships between a plurality of user events based on an event location and an event time for each of the plurality of events;
create an interaction graph of relationships between a plurality of content items manipulated by a user based on a manipulation location and a manipulation time for each of the plurality of content items;
identify shared times between the event times and the manipulation times and shared locations between the event locations and the manipulation locations; and
create an event graph of relationships between the plurality of user events and the plurality of content items by combining the context graph and the interaction graph based on the shared times and the shared locations.

11. The system of claim 10, the instructions when executed by the processor further causing the system to:
receive a natural language query for a content item from the user;
parse the natural language query to identify one or more query elements operable to identify at least one shared time or shared location associated with the content item;
build a graph query based on the one or more query elements;
query the event graph based on the graph query; and
in response to receiving query results, provide the query results to the user.

12. The system of claim 11, the instructions when executed by the processor further causing the system to:
order, in response to receiving multiple content items in the query results, the multiple content items based on one or more of:
a length of a manipulation time of a content item;
a temporal proximity to a shared manipulation time;
a level of approximation for a manipulation location of a content item; and
a confidence score for matching the graph query to the event graph.

13. The system of claim 11, the instructions when executed by the processor further causing the system to:
in response to receiving one content item in the query results, open an instance of a productivity application to display the one content item.

14. The system of claim 10, wherein the event times and the manipulation times are obtained based on at least one of:
parsing emails;
parsing calendar entries; or
an internal clock of the user device.

15. The system of claim 10, wherein the event locations and the manipulation locations are obtained based on at least one of:
parsing emails;
parsing calendar entries;
a Global Positioning System transceiver of a user device; or
a geo-location service using an Internet Protocol address of the user device.

16. A computer readable storage device including instructions that when executed by a processor are operable to provide an enhanced contextual search, comprising:
creating a context graph of relationships between user events based on event locations and event times;
creating an interaction graph of relationships between content items manipulated by a user based on manipulation locations and manipulation times;
identifying shared times between the event times and the manipulation times and shared locations between the event locations and the manipulation locations; and
creating an event graph of relationships between the user events and the content items by combining the context graph and the interaction graph based on the shared times and the shared locations.

17. The computer readable storage device of claim 16, wherein the instructions when executed by the processor are further operable for providing:
receiving a first contextual query to the event graph for a first content item, the first contextual query referencing a first event; and
returning the first content item based on a relationship in the event graph between the first content item and the first event.

18. The computer readable storage device of claim 17, wherein multiple candidate content items associated with the first event are returned, further comprising:
requesting additional detail regarding the first event;

receiving the additional detail regarding the first event; and selecting, based on the additional detail, one of the multiple candidate content items as the first content item.

19. The computer readable storage device of claim 17, further comprising:

receiving a second contextual query to the event graph for a second content item, the second contextual query referencing a second event;

in response to the second contextual query, not returning a result; and generating a clarification request requesting a new query with a different relationship to identify the second content item.

20. The computer readable storage device of claim 16, further comprising:

determining a relationship between an event and a content items including determining one or more of:

whether the content item has been manipulated at a shared time relative to the event occurring;

whether the content item has been manipulated at a shared time relative to another content item being manipulated; or whether the content item has been manipulated at a shared location with the event.

* * * * *